United States Patent
Ayuzawa et al.

(10) Patent No.: US 12,371,547 B2
(45) Date of Patent: Jul. 29, 2025

(54) INORGANIC-REINFORCED THERMOPLASTIC POLYESTER RESIN COMPOSITION AND MOLDED PRODUCTS COMPRISING SAME

(71) Applicant: TOYOBO CO., LTD., Osaka (JP)

(72) Inventors: Yoshitaka Ayuzawa, Otsu (JP); Takahiro Shimizu, Otsu (JP); Satoru Horiguchi, Otsu (JP)

(73) Assignee: TOYOBO MC CORPORATION, Osaka (JP)

( * ) Notice: Subject to any disclaimer, the term of this patent is extended or adjusted under 35 U.S.C. 154(b) by 553 days.

(21) Appl. No.: 17/639,669

(22) PCT Filed: Sep. 2, 2020

(86) PCT No.: PCT/JP2020/033324
§ 371 (c)(1),
(2) Date: Mar. 2, 2022

(87) PCT Pub. No.: WO2021/045124
PCT Pub. Date: Mar. 11, 2021

(65) Prior Publication Data
US 2022/0289931 A1    Sep. 15, 2022

(30) Foreign Application Priority Data
Sep. 5, 2019   (JP) .................................. 2019-161931

(51) Int. Cl.
| | |
|---|---|
| C08L 67/02 | (2006.01) |
| C08K 3/013 | (2018.01) |
| C08K 3/40 | (2006.01) |
| C08K 7/00 | (2006.01) |
| C08K 7/14 | (2006.01) |
| C08L 23/08 | (2025.01) |
| C08L 67/03 | (2006.01) |
| C08L 69/00 | (2006.01) |

(52) U.S. Cl.
CPC ............... C08K 3/013 (2018.01); C08K 3/40 (2013.01); C08K 7/14 (2013.01)

(58) Field of Classification Search
CPC .. C08K 3/013; C08K 3/40; C08K 7/14; C08L 23/08; C08L 67/02; C08L 69/00; C08L 23/0884
See application file for complete search history.

(56) References Cited

U.S. PATENT DOCUMENTS

| | | | | |
|---|---|---|---|---|
| 5,112,913 A * | 5/1992 | Horiuchi | ................ | C08L 67/02 525/146 |
| 5,741,446 A | 4/1998 | Tahara et al. | | |
| 7,268,190 B2 * | 9/2007 | Ohme | ..................... | C08L 59/00 524/593 |
| 2005/0256275 A1 * | 11/2005 | Kobayashi | .............. | C08L 69/00 525/349 |
| 2009/0275678 A1 * | 11/2009 | Kumazawa | ............. | C08L 69/00 525/225 |
| 2010/0201037 A1 * | 8/2010 | Takenaka | ................. | C08J 3/201 264/328.17 |
| 2011/0160364 A1 * | 6/2011 | Toyohara | ................ | C08L 67/04 524/424 |
| 2015/0368458 A1 | 12/2015 | Sun et al. | | |
| 2021/0002477 A1 | 1/2021 | Shimoharai et al. | | |

FOREIGN PATENT DOCUMENTS

| | | |
|---|---|---|
| CN | 101787183 | 7/2010 |
| CN | 106459564 | 2/2017 |
| JP | 3390539 | 3/2003 |
| JP | 3421188 | 6/2003 |
| JP | 3549341 | 8/2004 |
| JP | 2006-111693 | 4/2006 |
| JP | 2007-269890 | 10/2007 |
| JP | 2008-120925 | 5/2008 |
| JP | 2008-214558 | 9/2008 |
| JP | 2010-24312 | 2/2010 |
| JP | 4696476 | 6/2011 |
| JP | 2013-1772 | 1/2013 |
| JP | 2013-159732 | 8/2013 |
| KR | 20050007961 A * | 1/2005 |
| KR | 101168426 B1 * | 7/2012 |
| WO | 2015/008831 | 1/2015 |
| WO | 2019/172216 | 9/2019 |

OTHER PUBLICATIONS

KR 20050109049a machine translation of Published KR 10-1168426B1 [ (Year: 2012).*
International Search Report (ISR) issued Nov. 2, 2020 in International (PCT) Application No. PCT/JP2020/033324.
Office Action issued Feb. 10, 2023 in corresponding Chinese Patent Application No. 202080062442.2, with English language translation.
Office Action issued Nov. 19, 2024 in Japanese Patent Application No. 2021-517736, with English-language Translation.

\* cited by examiner

*Primary Examiner* — Michael J Feely
(74) *Attorney, Agent, or Firm* — Wenderoth, Lind & Ponack, L.L.P.

(57) ABSTRACT

The present invention is a thermoplastic polyester resin composition which in a composition including an inorganic-reinforcing material such as glass fiber, maintains a good surface appearance while having high strength and high stiffness, has little warpage deformation, and generates very little burr; and an inorganic-reinforced thermoplastic polyester resin composition comprising 20 to 60% by mass of a polybutylene terephthalate resin (A), 5 to 20% by mass of an amorphous resin (B), 30 to 60% by mass of an inorganic-reinforcing material (C), 0.5 to 10% by mass of an ethylene-glycidyl (meth)acrylate copolymer (D), and 0.05 to 2% by mass of a transesterification inhibitor (E), wherein the composition has a melt viscosity of no less than 0.5 kPa·s and no more than 1.5 kPa·s at 265° C. and a shear rate of 10 sec$^{-1}$.

5 Claims, 1 Drawing Sheet

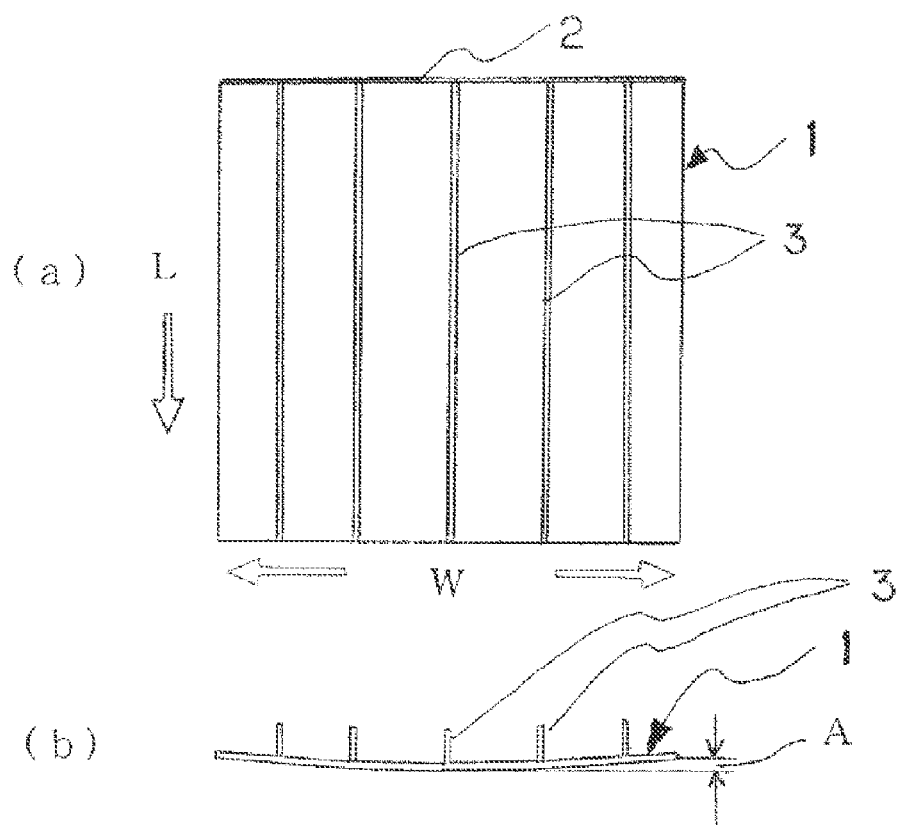

INORGANIC-REINFORCED THERMOPLASTIC POLYESTER RESIN COMPOSITION AND MOLDED PRODUCTS COMPRISING SAME

TECHNICAL FIELD

The present invention relates to an inorganic-reinforced polyester resin composition containing a thermoplastic polyester resin and an inorganic-reinforcing material such as glass fiber. More specifically, the present invention relates to an inorganic-reinforced polyester resin composition capable of providing a molded product having a small appearance defect due to lifting of an inorganic-reinforcing material of the molded product, a good surface gloss, a small warpage deformation, and an extremely small burr while maintaining high stiffness and high strength even in a thin and long molded product.

BACKGROUND ART

In general, polyester resins are excellent in mechanical properties, heat resistance, chemical resistance and the like, and are widely used in automobile parts, electric and electronic parts, household miscellaneous goods and the like. In particular, it is known that a polyester resin composition reinforced with an inorganic-reinforcing material such as glass fiber is dramatically improved in stiffness, strength, and heat resistance, and particularly, the stiffness is improved depending on the addition amount of the inorganic-reinforcing material.

However, when the addition amount of the inorganic-reinforcing material such as glass fiber is increased, the inorganic-reinforcing material such as glass fiber may be lifted on the surface of the molded product, and the appearance, especially the surface gloss, is significantly lowered, and the commercial value may be impaired.

Therefore, as a method of improving the appearance of the molded product, it has been proposed to perform molding by setting the mold temperature at the time of molding at an extremely high temperature, for example, 120° C. or higher. However, in this method, a special device is required to raise the mold temperature, so that not only no molding machine can be used for general purposes, but also there are cases where lifting of glass fiber or the like occurs at the end portion of the molded product which is far from the gate in the mold even if the mold temperature is increased to a high temperature, so that a good molding appearance cannot be obtained, or warping of the molded product becomes large, thereby causing problems.

Further, in recent years, it has been proposed to improve a mold so as to obtain a molded product having high glossiness from any one of various inorganic-reinforcing materials such as glass fiber (Patent Literatures 1 and 2). An object of this mold improvement is to insert ceramics with high heat insulating properties, such as zirconia ceramics, into the cavity portion of the mold, to control the quenching of the molten resin immediately after filling the cavity, to hold the resin in the cavity at a high temperature, and to obtain a molded product with excellent surface properties. However, these methods have problem that they are expensive in manufacturing a mold, and although effective for a simple molding shape such as a flat plate, they make it difficult to process ceramics and thereby manufacture a mold with high accuracy in the case of a complicated molded product.

Therefore, there has been proposed a polyester resin composition capable of suppressing the appearance and warpage deformation of a molded product even in the case of a resin composition containing an inorganic-reinforcing material such as glass fiber by improving the characteristics of the resin composition without requiring any special improvement of the mold or setting a high temperature (Patent Literatures 3 to 6).

According to the compositions of the above documents, by including various amorphous resins, copolymerized polyesters and the like and controlling the crystallization behavior of the resin composition, even when the mold temperature is 100° C. or lower, in the resin composition to which glass fibers and the like are added, a good surface appearance can be obtained and warpage deformation can be suppressed.

On the other hand, in addition to the above appearance and warpage deformation, especially when a crystalline resin such as a polyester resin is molded, burrs of the molded product may become a problem. Once burrs are generated, a burr removing process or the like is required, which takes time and cost. In particular, in recent years, for the purpose of weight reduction or the like, the wall thickness of the molded product tends to be thinner and the size of the molded product tends to be smaller, and thus the problem of burrs becomes relatively frequent. The burr generation is partly due to the formation of gaps due to the mold aging, but is generally largely affected by a resin factor. In the case of using an amorphous resin, it is known that burrs tend to decrease due to its viscosity characteristics, but there are not many examples of studying burrs of a crystalline resin except for an olefin-based resin that shows similar behavior to an amorphous resin. As a matter of course, there is no description about burrs in the prior art documents that have been described and the like, and an attempt to suppress burrs in a polyester resin in terms of composition has hardly been carried out. In general, burrs tend to be easily generated when the flowability is too good, so it is easy to imagine a method for increasing the viscosity of the resin. However, when the viscosity is simply increased, a very high pressure is required in order to fill the entire molded product with the resin, so the mold may not be able to withstand the pressure and may open, thereby causing burrs. This tendency becomes more remarkable when the wall thickness of the product is thin. A polyester resin composition that solves this problem has already been proposed (Patent Literature 7).

In recent years, the length of the molded product has been further increased, and further increased stiffness (flexural modulus exceeding 17 GPa) has been required. Therefore, the filling pressure of the resin tends to be further increased, and the shape of the molded product in which burrs are easily generated is often obtained. Materials that have a good appearance and suppress the generation of burrs while achieving high stiffness and high strength even in a thin and long molded product have been required, and it has been a very important issue to achieve a balance between these qualities.

CITATION LIST

Patent Literature

PTL 1: Japanese Patent No 3421188
PTL 2: Japanese Patent No. 3549341
PTL 3: Japanese Patent Laying-Open No. 2008-214558
PTL 4: Japanese Patent No. 3390539
PTL 5: Japanese Patent Laying-Open No. 2008-120925

PTL 6: Japanese Patent No. 4696476
PTL 7: Japanese Patent Laying-Open No. 2013-159732

SUMMARY OF INVENTION

Technical Problem

An object of the present invention is to provide a polyester resin composition which does not lose characteristics as a polyester resin, and in a composition including an inorganic-reinforcing material such as glass fiber, maintains a good surface appearance while having high strength and high stiffness (flexural modulus exceeding 17 GPa), has little warpage deformation, and generates very little burr even in a thin and long molded product.

Solution to Problem

According to the studies made by the present inventors, it has been found that, in an inorganic-reinforced thermoplastic polyester resin composition, by adjusting the blending ratio of a polybutylene terephthalate resin, at least one polyester resin other than the polybutylene terephthalate resin, and other components, both good moldability and the effect of suppressing burrs can be achieved even in the case of molding requiring particularly high cycle performance. However, when the stiffness required for the material is increased (the flexural modulus exceeding 17 GPa) and the molded product has a thinner and longer shape, it is difficult to maintain the effect of suppressing burrs with the materials in the previous inventions. Therefore, it is essential to design a new composition in view of the stiffness of the material and the shape of the molded product.

As a result of intensive studies, the present inventors have found that, in the inorganic-reinforced thermoplastic polyester resin composition, by including an amorphous resin and readjusting the blending ratio of each component, it is possible to effectively suppress burrs even in a thin and long molded product which particularly requires high stiffness, and have reached the present invention.

That is, the present invention has the following configuration.

[1] An inorganic-reinforced thermoplastic polyester resin composition comprising:
  20 to 60% by mass of a polybutylene terephthalate resin (A);
  5 to 20% by mass of an amorphous resin (B);
  30 to 60% by mass of an inorganic-reinforcing material (C);
  0.5 to 10% by mass of an ethylene-glycidyl (meth) acrylate copolymer (D); and
  0.05 to 2% by mass of a transesterification inhibitor (E).
  wherein the inorganic-reinforced thermoplastic polyester resin composition has a melt viscosity of no less than 0.5 kPa·s and no more than 1.5 kPa·s at 265° C. and a shear rate of 10 $sec^{-1}$.
[2] The inorganic-reinforced thermoplastic polyester resin composition according to [1], wherein the amorphous resin (B) is at least one selected from the group consisting of a polycarbonate resin and a polyarylate resin.
[3] The inorganic-reinforced thermoplastic polyester resin composition according to [1] or [2], wherein the inorganic-reinforced thermoplastic polyester resin composition has a crystallization temperature during temperature decrease of higher than 180° C. as measured by a differential scanning calorimeter (DSC).
[4] The inorganic-reinforced thermoplastic polyester resin composition according to any one of [1] to [3], wherein the inorganic-reinforcing material (C) contains a glass fiber and a glass flake.
[5] A molded product comprising the inorganic-reinforced thermoplastic polyester resin composition according to any one of [1] to [4].

Advantageous Effects of Invention

According to the present invention, even in a resin composition including a large amount of an inorganic-reinforcing material, by adjusting the blending ratio of each component, the lifting of the inorganic-reinforcing material on the surface of the molded product can be suppressed, so that the appearance of the molded product can be greatly improved, and a molded product having good appearance and low warpage while having high strength and high stiffness can be obtained. Furthermore, in particular, since it is possible to greatly suppress the generation of burrs with respect to the pressure at the time of molding even in a thin and long molded product or the like, a deburring process or the like after molding can be eliminated.

BRIEF DESCRIPTION OF DRAWINGS

FIG. 1 is (a) a schematic top view and (b) a schematic side view schematically showing an example of a molded product molded for evaluating warpage deformation.

DESCRIPTION OF EMBODIMENTS

Hereinafter, the present invention will be described in detail. The blending amount of each component described below represents the amount (% by mass) when the inorganic-reinforced thermoplastic polyester resin composition is 100% by mass. Since the blended amount of each component is the content in the inorganic-reinforced thermoplastic polyester resin composition, the blending amount and the content are the same.

A polybutylene terephthalate resin (A) in the present invention is a resin having the largest content in all the resins in the inorganic-reinforced thermoplastic polyester resin composition of the present invention. The polybutylene terephthalate resin (A) is not particularly limited, but a homopolymer mainly composed of terephthalic acid and 1,4-butanediol may be used. Further, other components can be copolymerized up to about 5 mol % within a range that does not impair moldability, crystallinity, surface gloss, and the like. The copolymerization amount is an amount when the acid component is 100 mol % and the glycol component is 100 mol %. Other components include those described below.

Examples of the component to be copolymerized include, as an acid component other than terephthalic acid, an aromatic or aliphatic polybasic acid such as isophthalic acid, naphthalenedicarboxylic acid, adipic acid, sebacic acid, trimellitic acid or esters thereof, and as a glycol component other than 1,4-butanediol, diethylene glycol, neopentyl glycol, 1,4-cyclohexanedimethanol, ethylene glycol, 1,2-propanediol, 1,3-propanediol, and 2-methyl-1,3-propanediol.

As a measure of the molecular weight of the polybutylene terephthalate resin (A), the reduction viscosity (in 25 ml of a phenol/tetrachloroethane (6/4 mass ratio) mixture, 0.1 g of the sample was dissolved and measured at 30° C. using a Ubbelohde viscometer, dl/g) is preferably in the range of 0.4 to 1.2 dl/g, more preferably in the range of 0.5 to 0.8 dl/g.

If the reduction viscosity is less than 0.4 dl/g, the toughness of the resin is decreased and burrs are easily generated due to too high flowability, and if the reduction viscosity is more than 1.2 dl/g, burrs also tend to occur due to the effect of a large decrease in flowability.

The blending amount of the polybutylene terephthalate resin (A) is 20 to 60% by mass, preferably 22 to 50% by mass, more preferably 24 to 40% by mass, and still more preferably 24 to 35% by mass. Inclusion of the polybutylene terephthalate resin within this range can satisfy various characteristics.

As the amorphous resin (B) in the present invention, known ones such as polycarbonate resin, polyarylate resin, polystyrene resin, acrylonitrile-styrene copolymer and the like can be used. In consideration of compatibility with polybutylene terephthalate resin and burr suppressing effect, polycarbonate resin and polyarylate resin are preferable.

The blending amount of the amorphous resin (B) is 5 to 20% by mass, preferably 6 to 20% by mass, and more preferably 10 to 20% by mass. If the amount is less than 5% by mass, the burr suppressing effect is small, and if the amount is more than 20% by mass, the deterioration of the molding cycle due to the decrease of crystallinity and the appearance defect due to the decrease of flowability are likely to occur, which is not preferable.

The polycarbonate resin can be produced by a solvent method, that is, a reaction of a dihydric phenol with a carbonate precursor such as phosgene, or a transesterification reaction of a dihydric phenol with a carbonate precursor such as diphenyl carbonate, in the presence of a known acid acceptor and molecular weight modifier in a solvent such as methylene chloride. Dihydric phenols preferably used herein include bisphenols, and particularly 2,2-bis(4-hydroxyphenyl)propane, that is, bisphenol A. Further, the bisphenol A may be partially or completely replaced with other dihydric phenols. Examples of dihydric phenols other than bisphenol A include compounds such as hydroquinone, 4,4-dihydroxydiphenyl, and bis(4-hydroxyphenyl)alkane; and halogenated bisphenols such as bis(3,5-dibromo-4-hydroxyphenyl)propane and bis(3,5-dichloro-4-hydroxyphenyl)propane. The polycarbonate may be a homopolymer using one kind of dihydric phenol or a copolymer using two or more kinds of dihydric phenols, and may be a resin in which a component other than polycarbonate (for example, a polyester component) is copolymerized within a range that does not impair the effects of the present invention (20% by mass or less).

The polycarbonate resin used is preferably one having a melt volume rate (unit: $cm^3/10$ min), measured at 300° C. and a load of 1.2 kg, of 1 to 100, and the melt volume rate is more preferably 2 to 80, and still more preferably 3 to 40. When a resin having a melt volume rate in this range is used, burrs can be effectively suppressed without impairing moldability. If a resin having a melt volume rate of less than 1 is used, flowability may be significantly reduced, and moldability may be deteriorated. If the melt volume rate exceeds 100, the molecular weight is too low, which leads to the deterioration of physical properties, and tends to cause problems such as gas generation due to decomposition.

The polyarylate resin used can be one produced by a known method. The polyarylate resin used is preferably one having a melt volume rate (unit: $cm^3/10$ min), measured at 360° C. and a load of 2.16 kg, of 1 to 100, and the melt volume rate is more preferably 2 to 80, and still more preferably 3 to 40. When a resin having a melt volume rate in this range is used, burrs can be effectively suppressed without impairing moldability. If a resin having a melt volume rate of less than 1 is used, flowability may be significantly reduced, and moldability may be deteriorated. If the melt volume rate exceeds 100, the molecular weight is too low, which leads to the deterioration of physical properties, and tends to cause problems such as gas generation due to decomposition.

Examples of the inorganic-reinforcing material (C) in the present invention include, but are not limited to, plate-crystal talc, mica, uncalcined clays, unspecified or spherical calcium carbonate, calcined clay, silica, glass beads, commonly used wollastonite and acicular wollastonite, glass fibers, glass flakes, carbon fibers, whiskers of aluminum borate or potassium titanate, milled fibers, which are short glass fibers having an average diameter of about 4 to 20 μm and a cut length of about 35 to 150 μm, and the like. Talc and wollastonite are the most excellent in terms of the molded product appearance, and glass fibers are the most excellent in terms of strength and stiffness. As to these inorganic-reinforcing materials, one kind of inorganic-reinforcing material may be used alone or two or more kinds thereof may be used in combination; however, it is preferable to mainly use glass fibers in terms of stiffness and the like.

As glass fibers among the inorganic-reinforcing materials (C), chopped strand fibers cut into a fiber length of about 1 to 20 mm can be preferably used. Regarding the cross-sectional shape of glass fibers, glass fibers having a circular cross-section or a non-circular cross-section can be used. As glass fibers with a circular cross-section, general glass fibers having an average fiber diameter of about 4 to 20 μm and a cut length of about 3 to 6 mm can be used. Examples of glass fibers with a non-circular cross-section include those having an approximately elliptical, approximately oval, or approximately cocoon-shaped cross-section perpendicular to the fiber length direction, and in this case, the flatness is preferably 1.5 to 8. The flatness as mentioned herein is the ratio of major axis/minor axis where assuming a rectangle with a minimum area circumscribed with a cross-section of a glass fiber perpendicular to the longitudinal direction of the glass fiber, the length of the longer sides of the rectangle is defined as the major axis and the length of the shorter sides is defined as the minor axis. Although the thickness the glass fibers is not particularly limited, those having a minor axis diameter of about 1 to 20 μm and a major axis diameter of about 2 to 100 μm can be used.

As these glass fibers, those that have been previously treated with a conventionally known coupling agent, such as an organic silane-based compound, an organic titanium-based compound, an organic borane-based compound, or an epoxy-based compound, can be preferably used.

The blending amount of the inorganic-reinforcing material (C) in the present invention is 30 to 60% by mass, preferably 35 to 60% by mass, and more preferably 35 to 57% by mass. When the inorganic-reinforcing material is included within this range, various characteristics can be satisfied.

When talc is used as the inorganic-reinforcing material (C), it is important that the blending amount thereof is within the range of 1% by mass or less in the resin composition, even when used in combination as the component (C). Since talc acts as a crystal nucleating agent, if it is used in excess of this blending amount, the crystallization rate increases, and appearance defects, such as glass lifting, tend to occur, which is not preferable.

In the present invention, when the inorganic-reinforcing material (C) is used in combination of two or more kinds, a combination of a glass fiber and a glass flake can be suitably selected from the viewpoints of flow characteristics and low warpage. By using a glass flake in the combination, not only warpage can be suppressed but also flowability can be improved.

When glass fiber and glass flake are used in combination as the inorganic-reinforcing material (C), the mass ratio of the glass fiber to the glass flake is preferably 40:60 to 90:10, and more preferably 45:55 to 80:20.

When the inorganic-reinforced thermoplastic polyester resin composition of the present invention contains 50 to 60% by mass of the inorganic-reinforcing material (C), the flexural modulus of a molded product obtained by injection molding of the inorganic-reinforced thermoplastic polyester resin composition can exceed 17 GPa.

As the ethylene-glycidyl (meth)acrylate copolymer (D), a terpolymer and quaternary or higher copolymers in which vinyl acetate, acrylic acid ester, or the like is further copolymerized, in addition to ethylene and glycidyl (meth) acrylate, can also be used. The glycidyl (meth)acrylate refers to either glycidyl acrylate or glycidyl methacrylate. Further, linear copolymers (random copolymers or block copolymers), graft copolymers, core-shell polymers, and the like can also be used. As the ethylene-glycidyl (meth)acrylate copolymer (D), one in which epoxy groups in the glycidyl (meth)acrylate react during grafting and the epoxy group remaining glycidyl (meth)acrylate component is 0% by mass can be used.

Examples of the acrylic acid esters that can be used for the ethylene-glycidyl (meth)acrylate copolymer (D) include (meth)acrylic acid alkyl esters having an alkyl group having 1 to 22 carbon atoms (the alkyl group may be linear or branched), such as methyl (meth)acrylate, ethyl (meth) acrylate, propyl (meth)acrylate, butyl (meth)acrylate, 2-ethylhexyl (meth)acrylate, cyclohexyl (meth)acrylate, stearyl (meth)acrylate, and methoxyethyl (meth)acrylate; (meth) acrylic acid polyalkylene glycol esters, (meth)acrylic acid alkoxyalkyl esters, (meth)acrylic acid hydroxyalkyl esters, (meth)acrylic acid dialkylaminoalkyl esters, (meth)acrylic acid benzyl esters, (meth)acrylic acid phenoxyalkyl esters, (meth)acrylic acid isobornyl esters, (meth)acrylic acid alkoxysilylalkyl esters, and the like. (Meth)acrylamide and (meth)acryldialkylamide can also be used. These can be used by appropriately selecting one kind or two or more kinds.

The blending amount of ethylene-glycidyl (meth)acrylate copolymer (D) is 0.5 to 10% by mass. For burrs, addition of a larger amount of the component (D) improves the viscosity of the entire resin composition and suppresses burr generation in the pressure-holding process, but a larger pressure is applied to thin-walled molded product and the like, which is likely to open the mold, thereby forming burrs, and significantly decreases the flowability, thereby increasing the possibility that the appearance of the molded product will be deteriorated. The blending amount is preferably 0.7 to 8% by mass, more preferably 0.8 to 5% by mass.

Furthermore, as ethylene-glycidyl (meth)acrylate copolymer (D), a copolymer in which the glycidyl (meth)acrylate component in which an epoxy group remains has 3 to 12% by mass of the total copolymer can be suitably used. More preferably, it is a copolymer having 3 to 6% by mass. Within the above range, the effect of suppressing burrs can be improved, and the toughness of the inorganic-reinforced thermoplastic polyester resin composition can also be enhanced.

Examples of the ethylene-glycidyl (meth)acrylate copolymer (D) used in the present invention include commercial products such as BONDFAST (manufactured by Sumitomo Chemical Co., Ltd.), LOTADER (manufactured by Arkema S.A.), ELVALOY (manufactured by DOW-MITSUI POLYCHEMICALS CO., LTD), METABLEN (manufactured by Mitsubishi Chemical Corporation), MODIPER (manufactured by NOF CORPORATION).

The transesterification inhibitor (E) used in the present invention is a stabilizer that prevents a transesterification reaction of a polyester resin or the like. With alloys of polyester-based resins, the transesterification reaction occurs to some extent due to the addition of heat history, no matter how much the production conditions are optimized. If the degree of the reaction becomes extremely large, characteristics expected from the alloy cannot be obtained. In particular, since the transesterification reaction of a polybutylene terephthalate resin and a polycarbonate resin often occurs, simply alloying them significantly reduces the crystallinity of polybutylene terephthalate, which is not preferable. In the present invention, the transesterification reaction between the polybutylene terephthalate resin (A) and the amorphous resin (B) (polycarbonate resin, polyarylate resin, and the like) is particularly prevented by adding the component (E), whereby more appropriate crystallinity can be maintained.

As the transesterification inhibitor (E), a phosphorus-based compound having a catalyst deactivation effect on polyester-based resins can be preferably used. For example, "ADK STAB AX-71" produced by ADEKA Corporation can be used.

The blending amount of transesterification inhibitor (E) is 0.05 to 2% by mass, more preferably 0.1 to 1% by mass. When the amount of the transesterification inhibitor (E) is less than 0.05% by mass, the desired transesterification reaction prevention performance is not exhibited in many cases, and the deterioration of the crystallinity of the inorganic-reinforced thermoplastic polyester resin composition may reduce the mechanical properties and cause mold release defects during injection molding. On the contrary, even if the addition amount exceeds 2% by mass, the effect is not enhanced so much; rather, it may cause the increase of gas and the like.

According to the inorganic-reinforced thermoplastic polyester resin composition of the present invention, in the molding of a long molded product (150 mm×20 mm×3 mmt (thickness)) at a cylinder temperature of 275° C. and a mold temperature of 110° C., the maximum amount of burr generation at the flow end can be controlled to less than 0.20 mm when a holding pressure of 75 MPa is applied for a filling time of 0.5 seconds. Burrs are generally most likely to be generated because the resin squeezes out of the mold due to the pressure in the pressure-holding process. This can be improved by adjusting the holding pressure; however, in that case, other defects (e.g., sink marks and appearance defects) may occur. In terms of resin, an improvement can be achieved by adjusting the resin viscosity so that it can withstand the pressure applied during pressure holding. However, although the method of increasing the viscosity of the entire resin is effective for burrs in the pressure-holding process, a large amount of pressure is required to fill the resin; as a result, the mold opens during injection, causing burrs. This tendency is especially remarkable in thin-walled molded products.

Therefore, the resin ideal for obtaining good thin-walled molded products without burrs has a melt viscosity behavior with good flowability during injection (during high shear) and increased resin viscosity in the pressure-holding process (during low shear). Resins exhibiting such behavior include olefin resins such as polyethylene, and amorphous resins such as acrylic-based resins. Therefore, it is easy to conceive of adding these resins to the polyester resin.

However, when an olefin resin or an acrylic-based resin is simply added, a relatively large amount of addition is required to achieve the ideal behavior; thus, the characteristics of the resin composition change, and the viscosity of the entire system increases, as described above. However, it has been found that the ideal melt viscosity behavior can be achieved without deteriorating the characteristics of the resin composition by blending each component as described above; and that burr generation can be suppressed, which are the points of the present invention.

In the inorganic-reinforced thermoplastic polyester resin composition of the present invention, the crystallization temperature during temperature decrease, which is determined by a differential scanning calorimeter (DSC), is preferably higher than 180° C. The crystallization temperature during temperature decrease is the crystallization peak top temperature of a thermogram obtained using a differential scanning calorimeter (DSC) by raising the temperature to 300° C. at a heating rate of 20° C./min in a nitrogen flow, holding that temperature for 5 minutes, and then lowering the temperature to 100° C. at a rate of 10° C./min. If the crystallization temperature during temperature decrease is 180° C. or less, the low crystallization speed may case mold release defects due to sticking to the mold, and may lead to deformation during ejection. The crystallization temperature during temperature decrease is preferably 195° C. or lower, and more preferably 190° C. or lower.

In particular, in a composition containing a large amount of inorganic-reinforcing material, when the crystallization temperature during temperature decrease is higher than 180° C., the inorganic-reinforcing material, such as glass fibers, generally tends to stand out on the surface of the molded product (so-called glass lifting). The cause thereof is that because the crystallization speed of the polyester resin composition increases, the propagation speed of the injection pressure tends to decrease, and the inorganic-reinforcing material, such as glass fibers, is partially exposed to the surface of the molded product. However, in the inorganic-reinforced thermoplastic polyester resin composition of the present invention, the blending amount of each component is adjusted so that a good appearance can be obtained even at a temperature of higher than 180° C., and it is possible to achieve both good moldability and good appearance.

In addition, the inorganic-reinforced thermoplastic polyester resin composition of the present invention may contain various known additives, as required, within the range that does not impair the characteristics of the present invention. Examples of known additives include colorants such as pigments, release agents, heat resistance stabilizers, antioxidants, UV absorbers, light stabilizers, plasticizers, modifiers, antistatic agents, flame retardants, dyes, and the like. These various additives can be contained in a total amount up to 5% by mass when the amount of the inorganic-reinforced thermoplastic polyester resin composition is 100% by mass. That is, the total amount of (A), (B), (C), (D), and (E) is preferably 95 to 100% by mass, based on 100% by mass of the inorganic-reinforced thermoplastic polyester resin composition.

Examples of release agents include long-chain aliphatic acids or esters thereof, metal salts, amide-based compounds, polyethylene wax, silicone, polyethylene oxide, and the like. The long-chain aliphatic acid preferably has 12 or more carbon atoms, and examples thereof include stearic acid, 12-hydroxystearic acid, behenic acid, montanic acid, and the like, and these may be partially or completely esterified with monoglycol or polyglycol, or a metal salt may be formed. Examples of amide-based compounds include ethylene bis-terephthalamide, methylene bisstearylamide, and the like. These release agents may be used alone or as a mixture.

The inorganic-reinforced thermoplastic polyester resin composition of the present invention has a melt viscosity of 0.5 kPa·s or more and 1.5 kPa·s or less, preferably 0.6 kPa·s or more and 1.4 kPa·s or less, and more preferably 0.7 kPa·s or more and 1.3 kPa·s or less at a shear rate of 10 $sec^{-1}$ at 265° C. If the melt viscosity is less than 0.5 kPa·s, injection molding becomes difficult. On the other hand, if it is larger than 1.5 kPa·s, burrs are likely to be generated in the molded product.

As a method for producing the inorganic-reinforced thermoplastic polyester resin composition of the present invention, it can be produced by mixing the above-mentioned components and optionally various stabilizers, pigments, and the like, and melt-kneading them. The melt-kneading method may be any method known to those skilled in the art. A single-screw extruder, a twin-screw extruder, a pressure kneader, a Banbury mixer, or the like can be used. Among these, a twin-screw extruder is preferably used. As general melt-kneading conditions, for a twin-screw extruder, the cylinder temperature is 230 to 300° C. and the kneading time is 2 to 15 minutes.

EXAMPLES

Hereinafter, the present invention will be described in more detail with reference to Examples, but the present invention is not limited to these Examples.

The measured values described in Examples were measured by the following methods.
(1) Reduction Viscosity of Polybutylene Terephthalate Resin In 25 ml of a phenol/tetrachloroethane (6/4 mass ratio) mixture, 0.1 g of the sample was dissolved and measured at 30° C. using a Ubbelohde viscometer. (Unit: dl/g)
(2) Burr Generation Amount As for the burr generation amount, in molding a long molded product (150 mm×20 mm×3 mmt (thickness)) by injection molding at a cylinder temperature of 275° C. and a mold temperature of 110° C., the largest burr at the flow end generated in the molded product was measured using a microscope when a holding pressure of 75 MPa was applied at an injection speed in which the filling time was 0.5 seconds.
(3) Molded Product Appearance (Lifting of Glass Fiber or the Like)

The appearance of the molded product molded under the above condition (2) was visually observed.
  A: The appearance was good without appearance defects due to lifting of glass fibers and the like on the surface.
  B: The molded product had a few appearance defects particularly at its end and the like
  C: The entire molded article had appearance defects.
(4) Molded Product Appearance (Uneven Embossing)

The appearance of the molded product molded under the above condition (2) was visually observed. For emboss, a mold with a pearskin embossing finished surface (15 µm in depth) was used. "A" and "B" mean a level without any problems.
  A: The appearance was good without appearance defects due to displaced embossing on the surface.
  B: A few pans of the molded product had appearance defects due to displaced embossing, and looked white when observed at different angles.

C: The entire molded product had appearance defects due to displaced embossing, and looked white when observed at different angles.

(5) Moldability

When molding was carried out under the above conditions (2), moldability was determined based on releasability when the cooling time after the completion of the injection process was set to 12 seconds.

AA: There was no remainder of sprue or the like, continuous molding was easily possible, and no extrusion pin marks remained.

A: There was no remainder of sprue or the like, and continuous molding was easily possible, but extrusion pin marks remained.

C: Mold release defects occurred once every shot or every few shots, and continuous molding was impossible due to a remainder of sprue and the like.

(6) Melt Viscosity

With respect to a pellet-shaped resin composition, using Capillograph 1B manufactured by Toyo Seiki Seisaku-Sho, Ltd., a melt viscosity at a shear rate of 10 sec$^{-1}$ was measured in conformity with ISO11443 at a furnace temperature of 265° C. using a capillary [1 mm (inner diameter φ)×30 mm (length L)].

(7) Warpage

Using a film gate mold of 100 mm×100 mm×2 mmt (thickness) with ribs on one side, a molded product having 5 ribs of 100 mm in length, 1 mm in height and 1 mm in thickness in the direction perpendicular to the direction of resin flow was molded by an injection molding machine at a resin temperature of 265 to 270° C. and mold temperatures of 80° C., 100° C., and 120° C., and the amount of warpage deformation was measured (value of A in FIG. 1, mean average value of three molded products). The following criteria were used for evaluation.

C: warpage deformation amount >3 mm
B: 3 mm ≥warpage deformation amount ≥2 mm
A: 1.5 mm ≤warpage deformation amount <2 mm
AA: warpage deformation amount <1.5 mm (8) Crystallization Temperature During Temperature Decrease Using a differential scanning calorimeter (DSC), each sample was sealed in a DSC device in a dry state with a water content of 0.03% by mass or less to prevent fluctuation due to water content for measurement. That is, the crystallization peak top temperature of a thermogram obtained using a differential scanning calorimeter (DSC) was determined by raising the temperature to 300° C. at a heating rate of 20° C./min in a nitrogen flow, holding that temperature for 5 minutes, and then lowering the temperature to 100° C. at a rate of 10° C./min.

The raw materials used in Examples and Comparative Examples are as follows.

(A) Polybutylene Terephthalate Resin
  (A) Polybutylene terephthalate: manufactured by Toyobo Co., Ltd., reduction viscosity 0.65 dl/g
(B) Amorphous Resin
  (B-1) Polycarbonate resin: "CALIBRE 301-6" manufactured by Sumika Polycarbonate Limited, melt volume rate (300° C., load 1.2 kg) 6 cm$^3$/10 min
  (B-2) Polycarbonate resin: "CALIBRE 200-80" manufactured by Sumika Polycarbonate Limited, melt volume rate (300° C., load 1.2 kg) 80 cm$^3$/10 min
  (B-3) Polyarylate resin: "U polymer" manufactured by Unitika Ltd., melt volume rate (360° C., load 2.16 kg) 4.0 cm$^3$/10 min
(C) Inorganic-Reinforcing Material
  (C-1) Glass fiber: "T-120H" manufactured by Nippon Electric Glass Co., Ltd.
  (C-2) Glass flake: "REFG-101" manufactured by Nippon Sheet Glass Company, Ltd.
(D) Ethylene-Glycidyl (Meth)Acrylate Copolymer
  (D-1): Ethylene-glycidyl methacrylate-methyl acrylate terpolymer (epoxy group residual glycidyl methacrylate component: 6% by mass), "BONDFAST 7M" manufactured by Sumitomo Chemical Co., Ltd.
  (D-2): Graft copolymer of ethylene-ethyl acrylate copolymer (main chain) and methyl methacrylate-butyl acrylate copolymer (side chain) (epoxy group residual glycidyl methacrylate component of main chain: 0% by mass), "MODIPER A5300" manufactured by NOF CORPORATION
(E) Transesterification Inhibitor
  (E): "ADK STAB AX-71" manufactured by ADEKA Corporation Regarding the inorganic-reinforced thermoplastic polyester resin compositions of the Examples and the Comparative Examples, the above raw materials were weighed in accordance with the blending ratio (% by mass) shown in Table 1, and melt-kneaded by a 35-diameter twin-screw extruder (produced by Toshiba Machine Co., Ltd.) at a cylinder temperature of 270° C. at a screw rotation speed of 100 rpm. The raw materials other than the component (C) were fed into the twin-screw extruder from a hopper, and the component (C) was fed by side-feeding from a vent port. The obtained pellets of each inorganic-reinforced thermoplastic polyester resin composition were dried and then molded into various evaluation samples with an injection molding machine. The molding conditions were a cylinder temperature of 275° C. and a mold temperature of 110° C. The evaluation results are shown in Table 1.

TABLE 1

| | | Example | | | | | | Comparative Example | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| Composition | (A) polybutylene terephthalate | 27 | 27 | 27 | 27 | 37 | 27 | 41.2 | 29 | 28.7 | 20 | 27.2 | 22 |
| | (B-1) polycarbonate resin | 14 | | | 14 | 19 | 14 | | 14 | 14 | 21 | 14 | 11 |
| | (B-2) polycarbonate resin | | 14 | | | | | | | | | | |
| | (B-3) polyarylate resin | | | 14 | | | | | | | | | |
| | (C-1) Glass fiver | 55.1 | 55.1 | 55.1 | 40.1 | 20.1 | 55.1 | 55.1 | 55.1 | 55.1 | 55.1 | 55.1 | 55.1 |
| | (C-2) Glass flake | | | | 15 | 20 | | | | | | | |
| | (D-1) | 2 | 2 | 2 | 2 | 2 | | 2 | | 0.3 | 2 | 2 | 5 |
| | (D-2) | | | | | | 2 | | | | | | 5 |
| | (E) | 0.2 | 0.2 | 0.2 | 0.2 | 0.2 | 0.2 | | 0.2 | 0.2 | 0.2 | | 0.2 |

TABLE 1-continued

|  |  | Example | | | | | | Comparative Example | | | | | |
| --- | --- | --- | --- | --- | --- | --- | --- | --- | --- | --- | --- | --- | --- |
|  |  | 1 | 2 | 3 | 4 | 5 | 6 | 1 | 2 | 3 | 4 | 5 | 6 |
| Charac-teristics | Melt viscosity (265° C., 10 sec$^{-1}$) [kPa · s] | 0.9 | 1.0 | 1.1 | 0.8 | 0.6 | 0.6 | 1.2 | 0.3 | 0.4 | 1.2 | 1.3 | 1.9 |
|  | Burr generation amount [mm] | 0.10 | 0.09 | 0.07 | 0.11 | 0.14 | 0.15 | 0.05 | 0.33 | 0.25 | 0.06 | 0.04 | 0.02 |
|  | Mold product appearance (lifting of glass fiber or the like) | A | A | A | A | A | A | C | A | A | A | A | C |
|  | Mold product appearance (embossing) | B | A | A | A | A | B | C | A | A | A | A | C |
|  | Warpage | A | A | A | AA | AA | A | C | A | A | A | A | A |
|  | Moldability | A | A | A | A | AA | A | C | A | A | C | C | B |
|  | Crystallization temperature during temperature decrease [° C.] | 189 | 188 | 185 | 189 | 189 | 189 | 198 | 189 | 189 | 176 | 168 | 187 |

(Note)
* The composition is expressed as a mass ratio (100% by mass based on the total resin composition).
* Each composition contains 0.2% by mass of a stabilizer (antioxidant), 0.5% by mass of a release agent, and 1% by mass of a black pigment.
Stabilizer: "IRGANOX 1010" manufactured by BASF Japan.
Release agent: "LICOLUB WE 40" manufactured by Clariant Japan Co., Ltd.
Black pigment: "PAB-8 K 470" manufactured by Sumika Color CO., Ltd.

As is apparent from Table 1, it can be seen that by satisfying the range defined by the present invention in Example 1 to 6, the amount of burrs generated can be significantly suppressed while maintaining the appearance and moldability of the molded product. Further, in Examples 4 and 5 in which glass fibers and glass flakes were used in combination, the effect of suppressing warpage was increased. On the other hand, in Comparative Examples 2 and 3, since the component (D) was not included or was less than a predetermined range, the effect of suppressing burrs was small. In Comparative Example 1, since the component (B) was not contained, the appearance, warpage and moldability were all inferior, and in Comparative Example 4, since the component (B) exceeded a predetermined range, the moldability (mold releasability) was deteriorated. In Comparative Example 5, since the component (E) was not contained, the transesterification reaction proceeded remarkably, and the crystallinity decreased, so that the moldability (mold releasability) deteriorated. Further, in Comparative Example 6, since the melt viscosity was higher than the predetermined range, the flowability was insufficient, and appearance defects due to lifting of the inorganic-reinforcing material and uneven embossing were observed.

INDUSTRIAL APPLICABILITY

According to the present invention, even in a resin composition including a large amount of an inorganic-reinforcing material, by adjusting the blending ratio of each component, the lifting of the inorganic-reinforcing material on the surface of the molded product can be suppressed, so that the appearance of the molded product can be greatly improved, and a molded product having good appearance and low warpage while having high strength and high stiffness can be obtained. Furthermore, in particular, since it is possible to greatly suppress the generation of burrs with respect to the pressure at the time of molding even in a thin and long molded product or the like, a deburring process or the like after molding can be eliminated. Therefore, it greatly contributes to the industry.

REFERENCE SIGNS LIST

L: Direction of resin composition flow
W: Direction perpendicular to resin composition flow
1: Molded product
2: Film gate
3: Rib
A: Warpage deformation amount

The invention claimed is:
1. An inorganic-reinforced thermoplastic polyester resin composition comprising:
  24 to 35% by mass of a polybutylene terephthalate resin (A);
  10 to 20% by mass of an amorphous resin (B);
  50 to 60% by mass of an inorganic-reinforcing material (C);
  0.5 to 10% by mass of an ethylene-glycidyl (meth) acrylate copolymer (D); and
  0.05 to 2% by mass of a transesterification inhibitor (E),
  wherein the inorganic-reinforced thermoplastic polyester resin composition has a melt viscosity of no less than 0.7 kPa·s and no more than 1.3 kPa·s at 265° C. and a shear rate of 10 sec$^{-1}$,
  wherein the inorganic-reinforcing material (C) contains a glass fiber and a glass flake, and
  wherein a mass ratio of the glass fiber to the glass flake is 40:60 to 90:10.
2. The inorganic-reinforced thermoplastic polyester resin composition according to claim 1, wherein the amorphous resin (B) is at least one selected from the group consisting of a polycarbonate resin and a polyarylate resin.
3. The inorganic-reinforced thermoplastic polyester resin composition according to claim 1, wherein the inorganic-reinforced thermoplastic polyester resin composition has a crystallization temperature during temperature decrease of higher than 180° C. as measured by a differential scanning calorimeter (DSC).
4. A molded product comprising the inorganic-reinforced thermoplastic polyester resin composition according to claim 1.

5. The molded product according to claim 4, wherein the molded product has a flexural modulus exceeding 17 GPa.

\* \* \* \* \*